Figure 1:
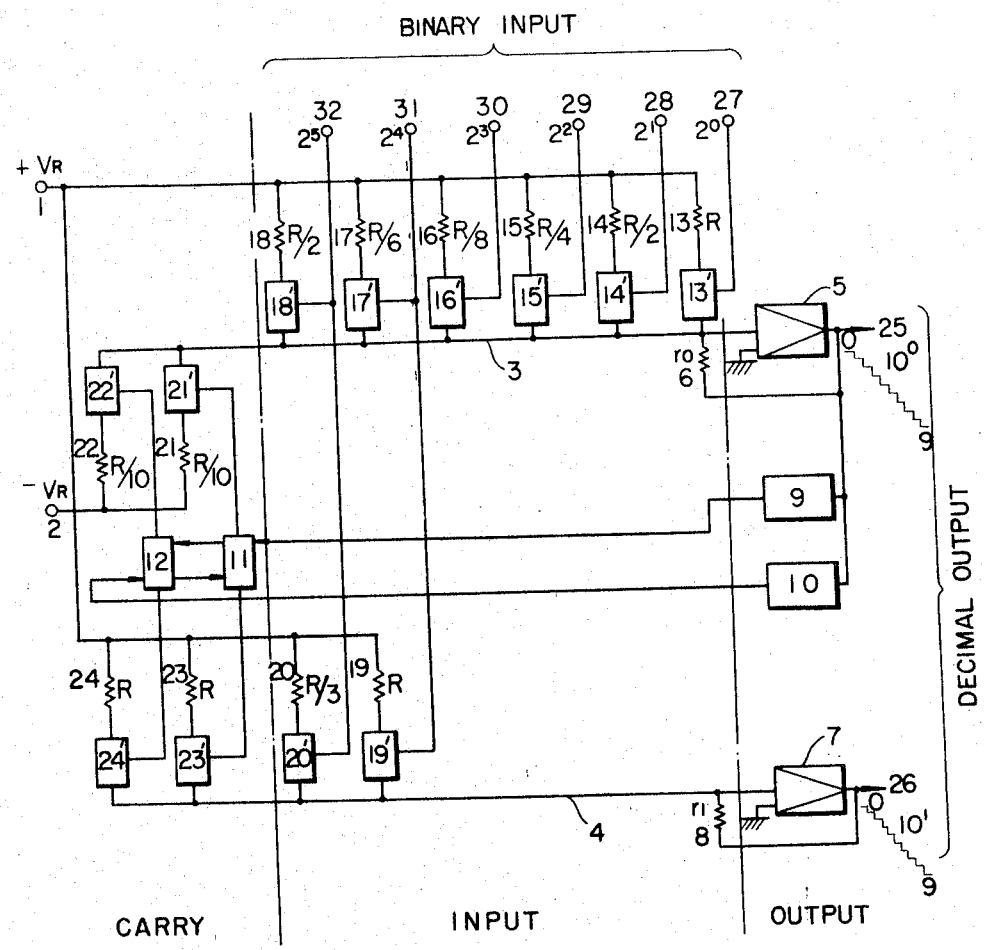

Jan. 3, 1967   SETURŌ KINBARA   3,296,610
SYSTEM FOR CONVERTING BINARY NUMBERS INTO DECIMAL NUMBERS
Filed June 28, 1963   15 Sheets-Sheet 1

INVENTOR.
SETURŌ KINBARA
BY
Kurt Kelman
AGENT

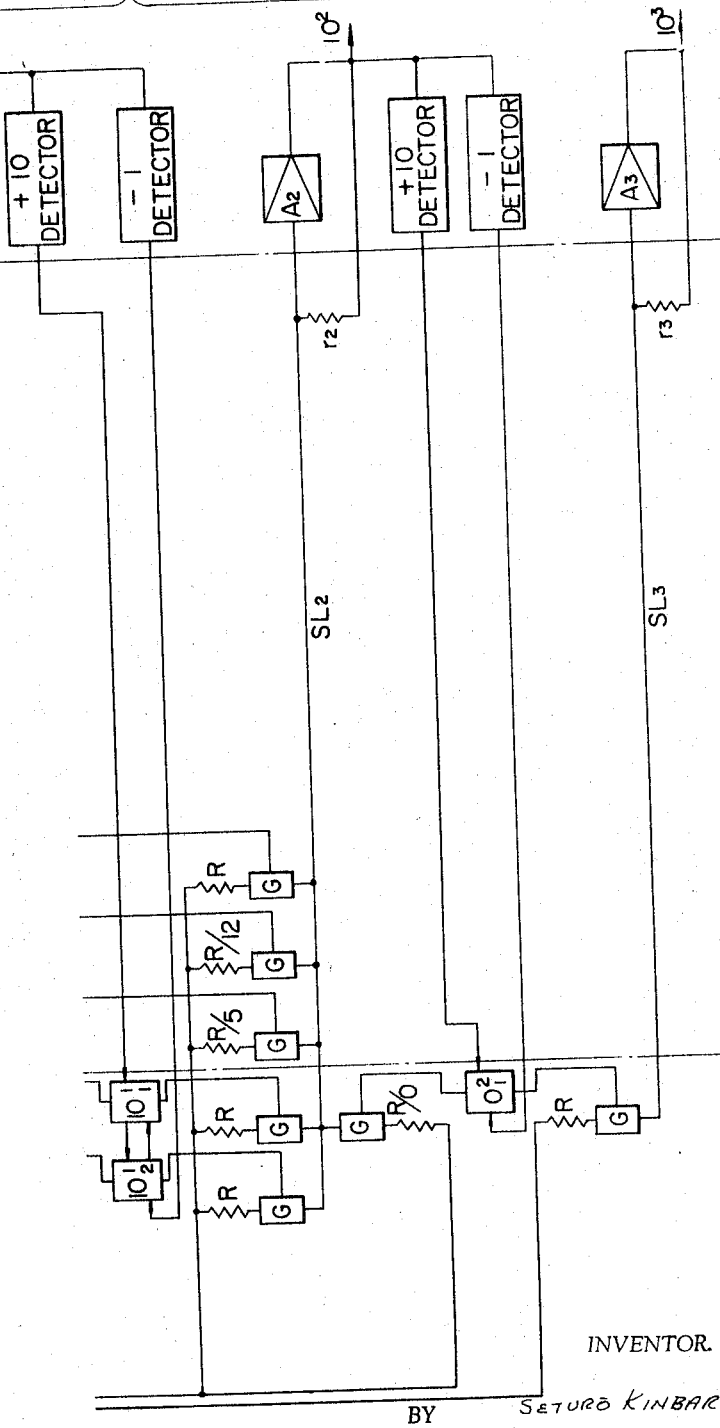

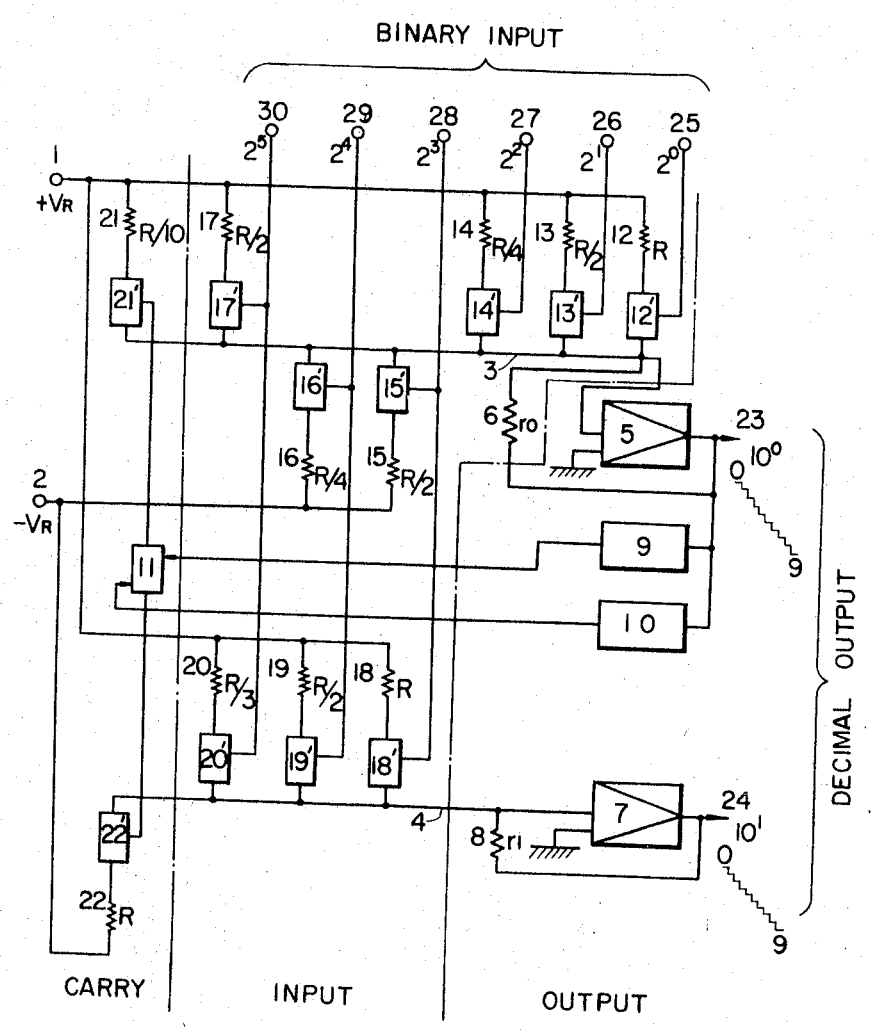

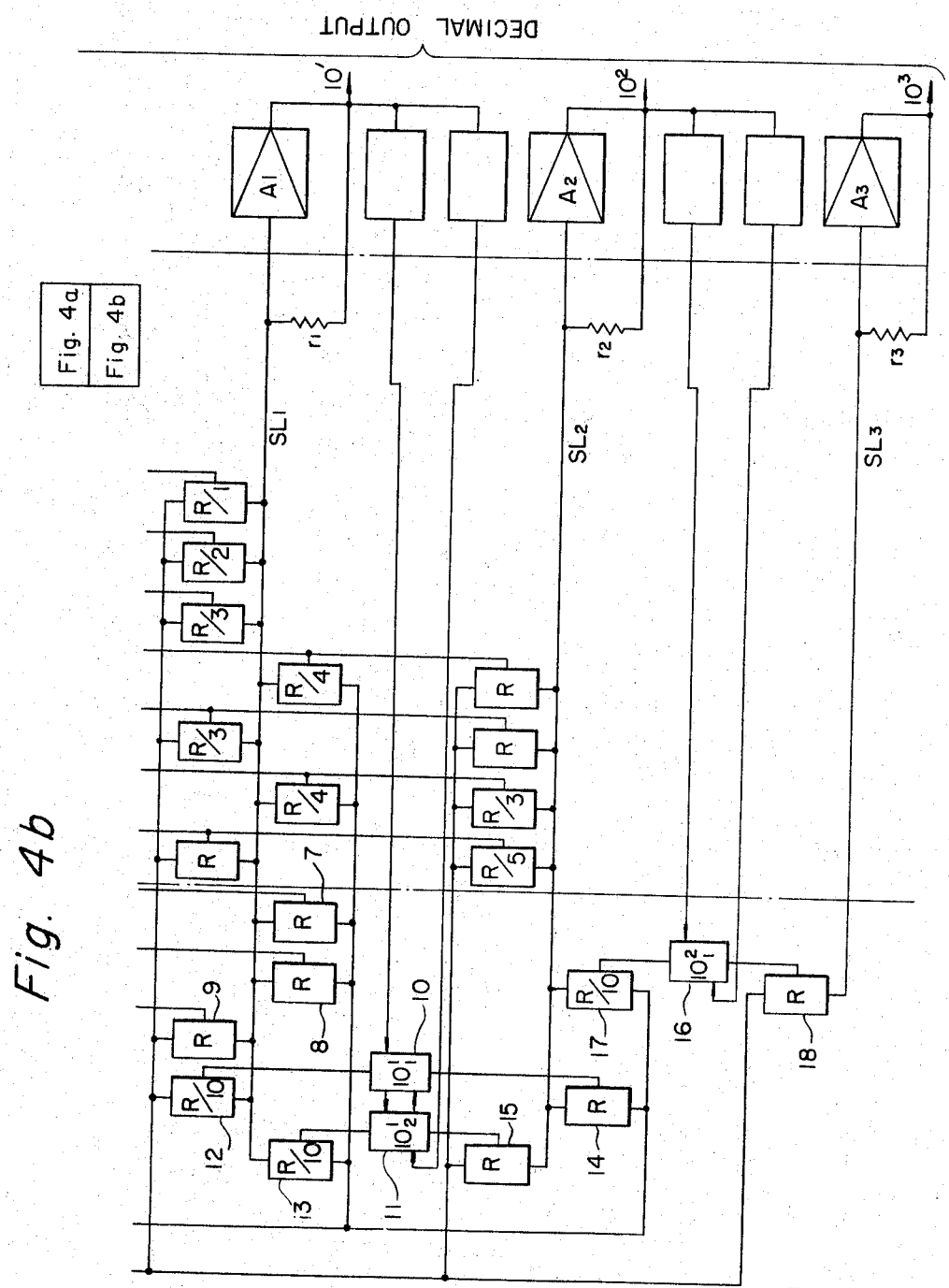

Jan. 3, 1967　　　　　SETURŌ KINBARA　　　　　3,296,610
SYSTEM FOR CONVERTING BINARY NUMBERS INTO DECIMAL NUMBERS
Filed June 28, 1963　　　　　　　　　　　　　　15 Sheets-Sheet 7
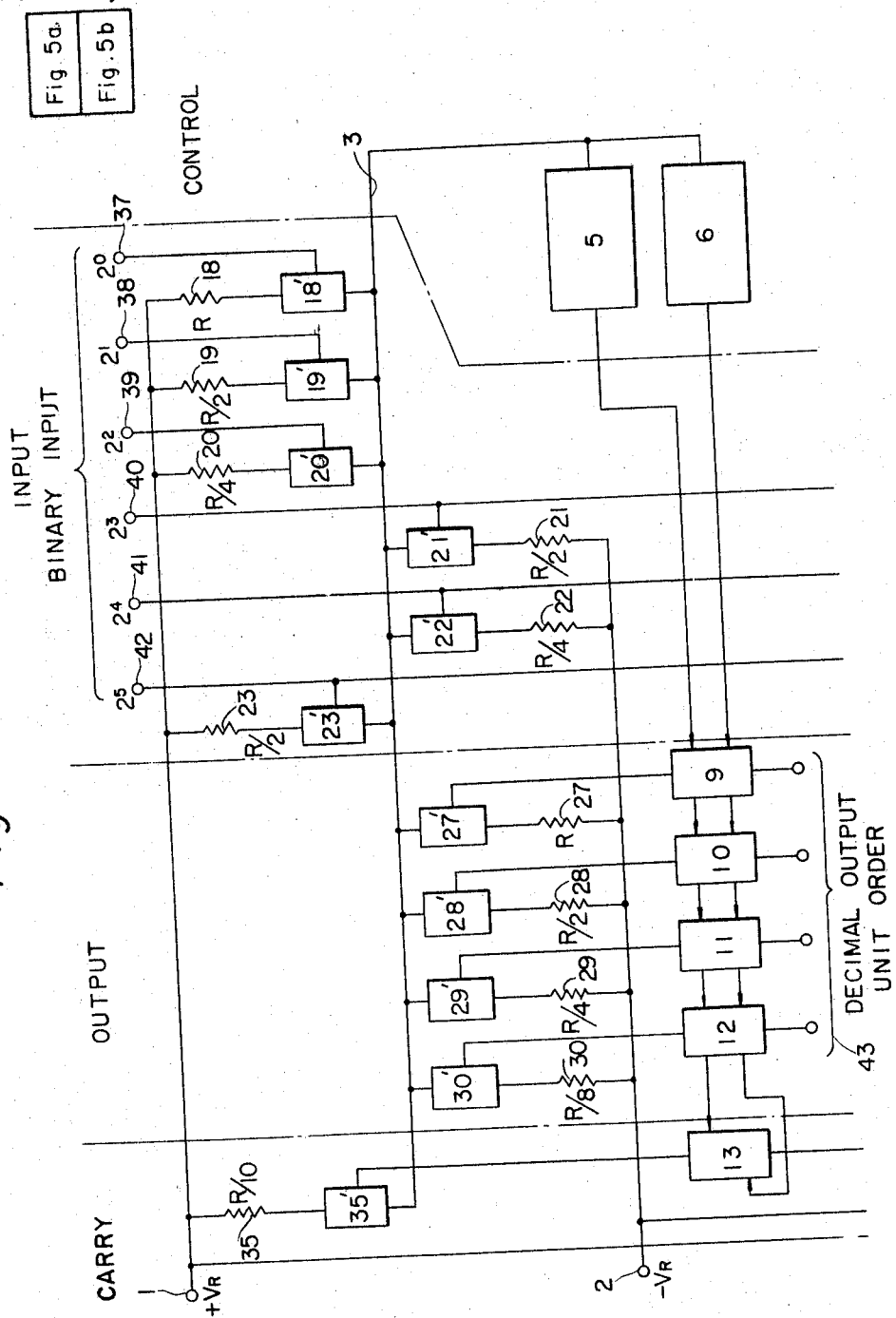
INVENTOR.
SETURŌ KINBARA
BY
Kurt Kelman
AGENT

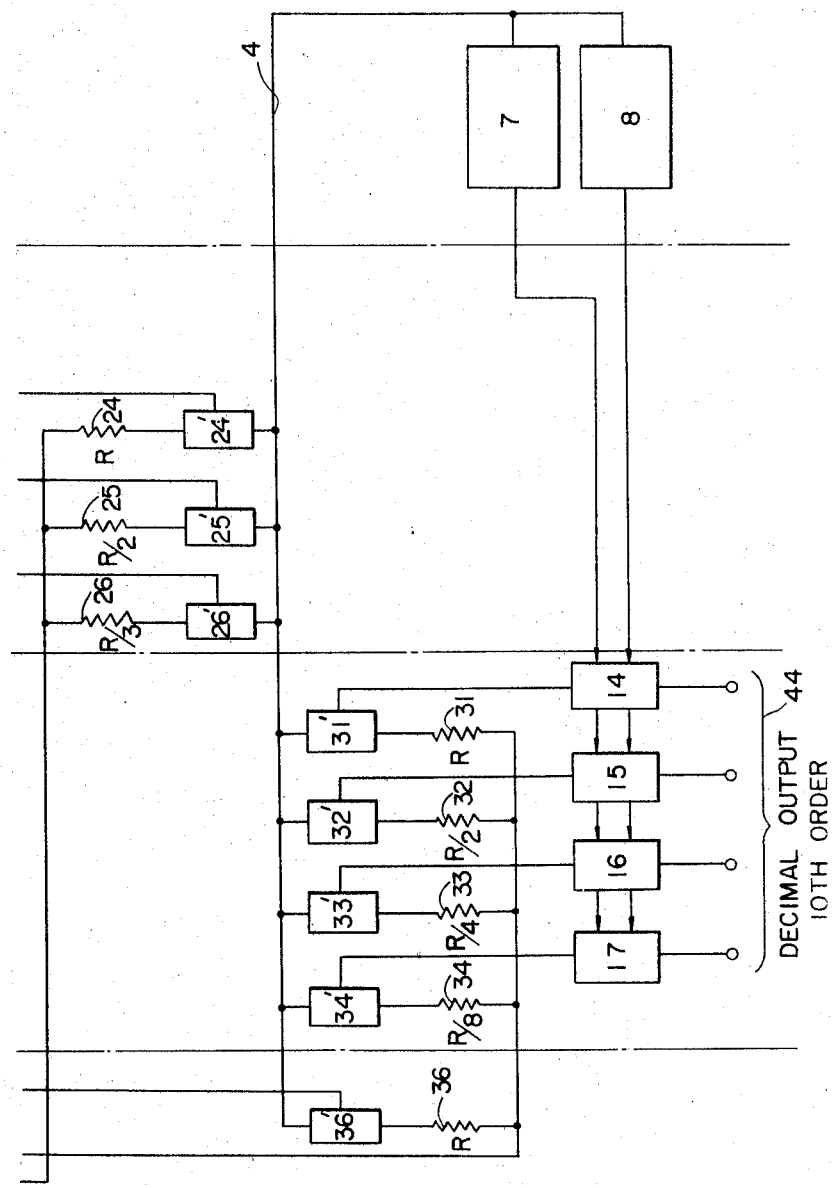

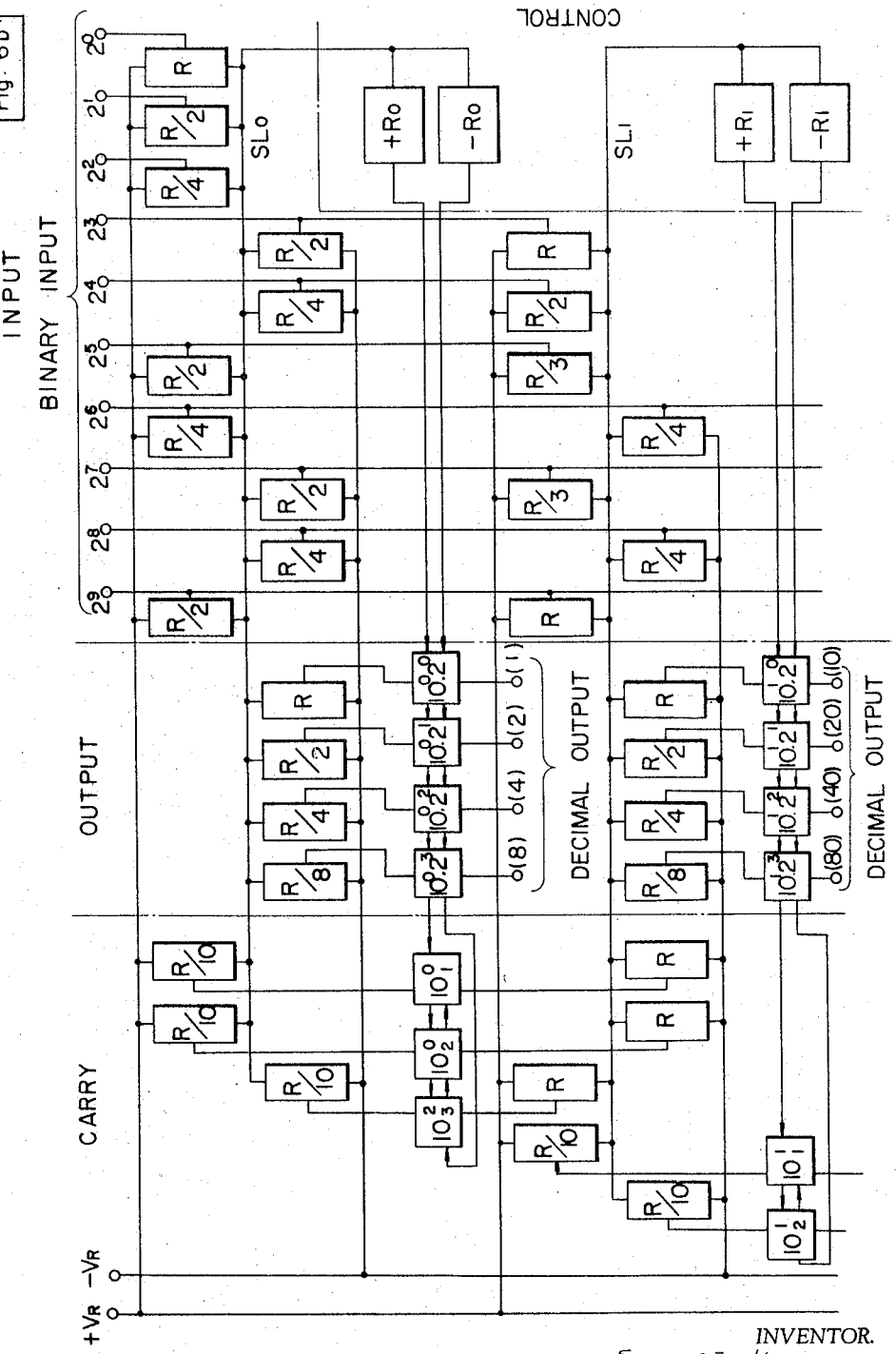

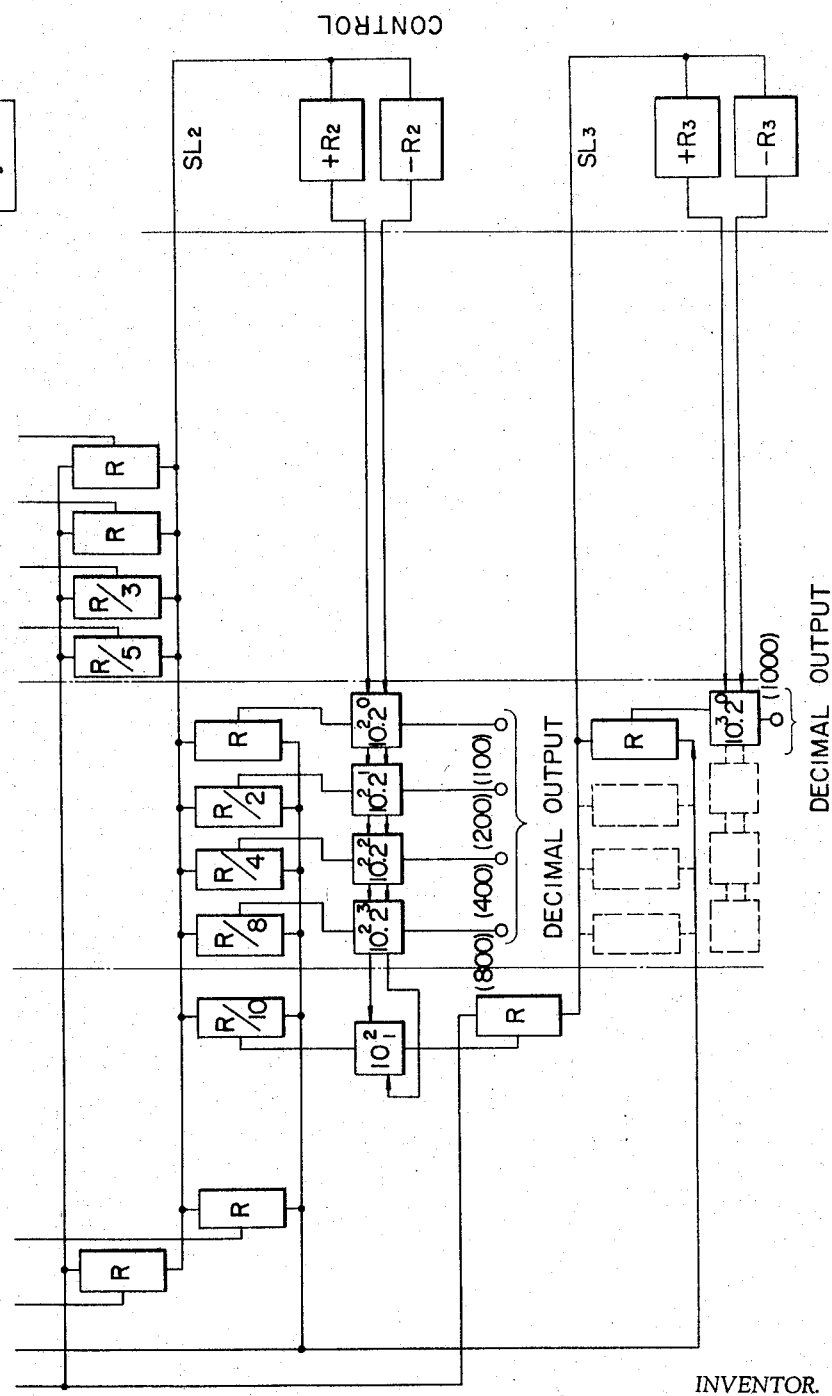

Jan. 3, 1967 SETURŌ KINBARA 3,296,610
SYSTEM FOR CONVERTING BINARY NUMBERS INTO DECIMAL NUMBERS
Filed June 28, 1963 15 Sheets-Sheet 11

INVENTOR.
SETURŌ KINBARA
BY
Kurt Kelman
AGENT

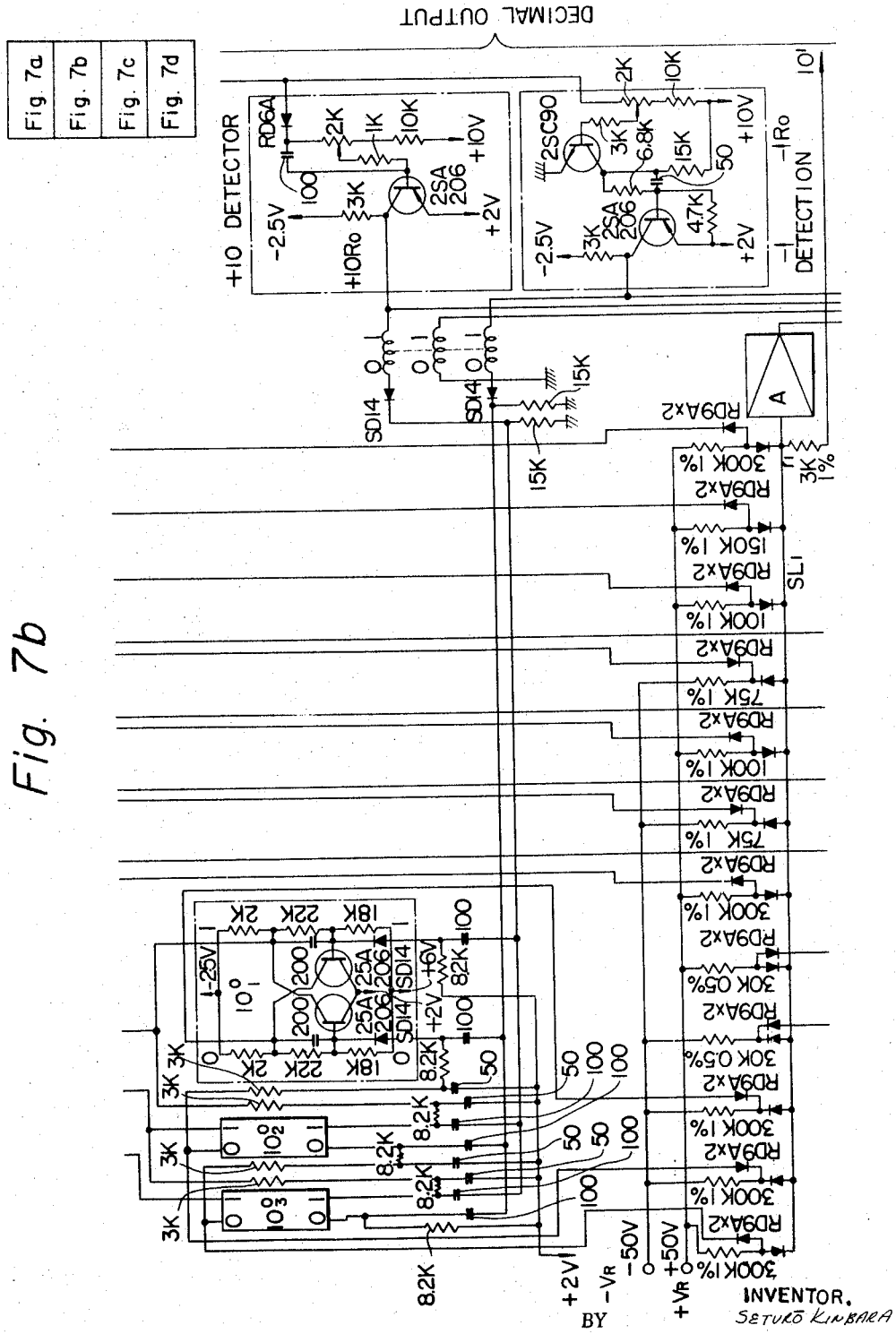

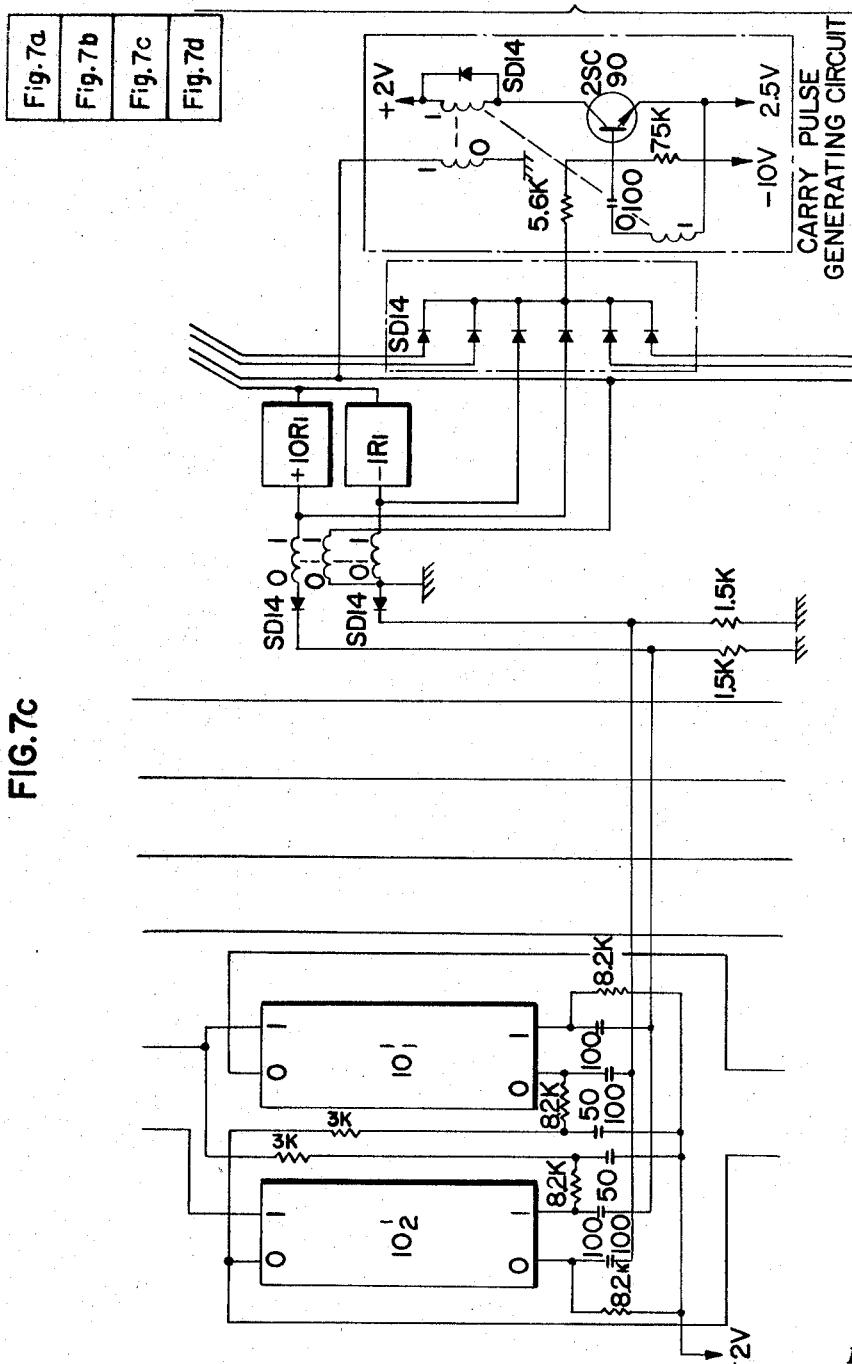

Jan. 3, 1967    SETURŌ KINBARA    3,296,610
SYSTEM FOR CONVERTING BINARY NUMBERS INTO DECIMAL NUMBERS
Filed June 28, 1963    15 Sheets-Sheet 15

INVENTOR.
SETURŌ KINBARA
BY
Kurt Kelman
AGENT

United States Patent Office 3,296,610
Patented Jan. 3, 1967

3,296,610
SYSTEM FOR CONVERTING BINARY NUMBERS INTO DECIMAL NUMBERS
Seturō Kinbara, Naka-gun, Ibaraki-ken, Japan, assignor to Nihon Genshiryoku Kenkyu Sho, Tokyo, Japan
Filed June 28, 1963, Ser. No. 291,439
Claims priority, application Japan, July 7, 1962, 37/28,464
3 Claims. (Cl. 340—347)

This invention relates to a system in which numbers represented in the binary code (hereinafter referred to as "binary numbers") are converted into numbers represented in the decimal code (hereinafter referred to "decimal numbers") and more particularly, to a conversion system in which the conversion time is extremely short, non-destructible conversion can be easily effected and an ability to follow up is provided.

Generally, in an electronic computer for digital numbers or a device consisting of analyzers similar to said computer (hereinafter this is referred to as a digital computer), the binary code is frequently used as the code for the numbers to simplify design and construction. However, as the decimal code is generally used, when information is to be read or the process of an operation is to be observed or controlled the binary numbers must be converted into decimal numbers.

In the conventional conversion system in which the binary code is converted into the decimal code (hereinafter, referred to as binary-decimal conversion system), a long time is required for the conversion and the conversion results in the substantial destruction of the original and, further the conversion has no ability to follow up. Here, the term "destroyed original" means a conversion in which the original state of the binary number is destroyed upon conversion into a decimal number, and the term "ability to follow up" means the ability of the conversion to vary decimal numbers automatically in response to changes in the binary numbers. There are some conversion systems which do not have the above-mentioned disadvantages. However in these systems the number of figures that can be stored is so limited such that conversion systems are not suitable for general use.

In conventional general conversion systems, the operating speed of the whole system is slow due to the faults described above and also the control circuit is complicated. Therefore, it is necessary to design the conversion system so that the decimal code is used as little as possible in observing and controlling the process of an operation.

In the present invention, improvements are accomplished in the following manner: (a) the conversion time is shortened, (b) the conversion does not destroy the original binary numbers and (c) an ability to follow up is provided so that the conversion system can be applied to any number of figures.

Therefore, the objects of this invention are to provide a conversion system in which decimal system observation and control of a binary code digital computer, can be easily effected, reading speed is increased, operating speed of the digital computer is increased, the construction is simplified and the degree of freedom in design is enlarged.

This invention relates to a binary-decimal conversion system and the fundamental circuit of the present invention is composed of well known circuits. The present invention is constructed by combining two binary systems, that is, the fundamental or principle construction and the actual construction, with the two decimal systems, that is, the analog construction and the digital construction and, therefore, four systems are combined.

Figure 2A:
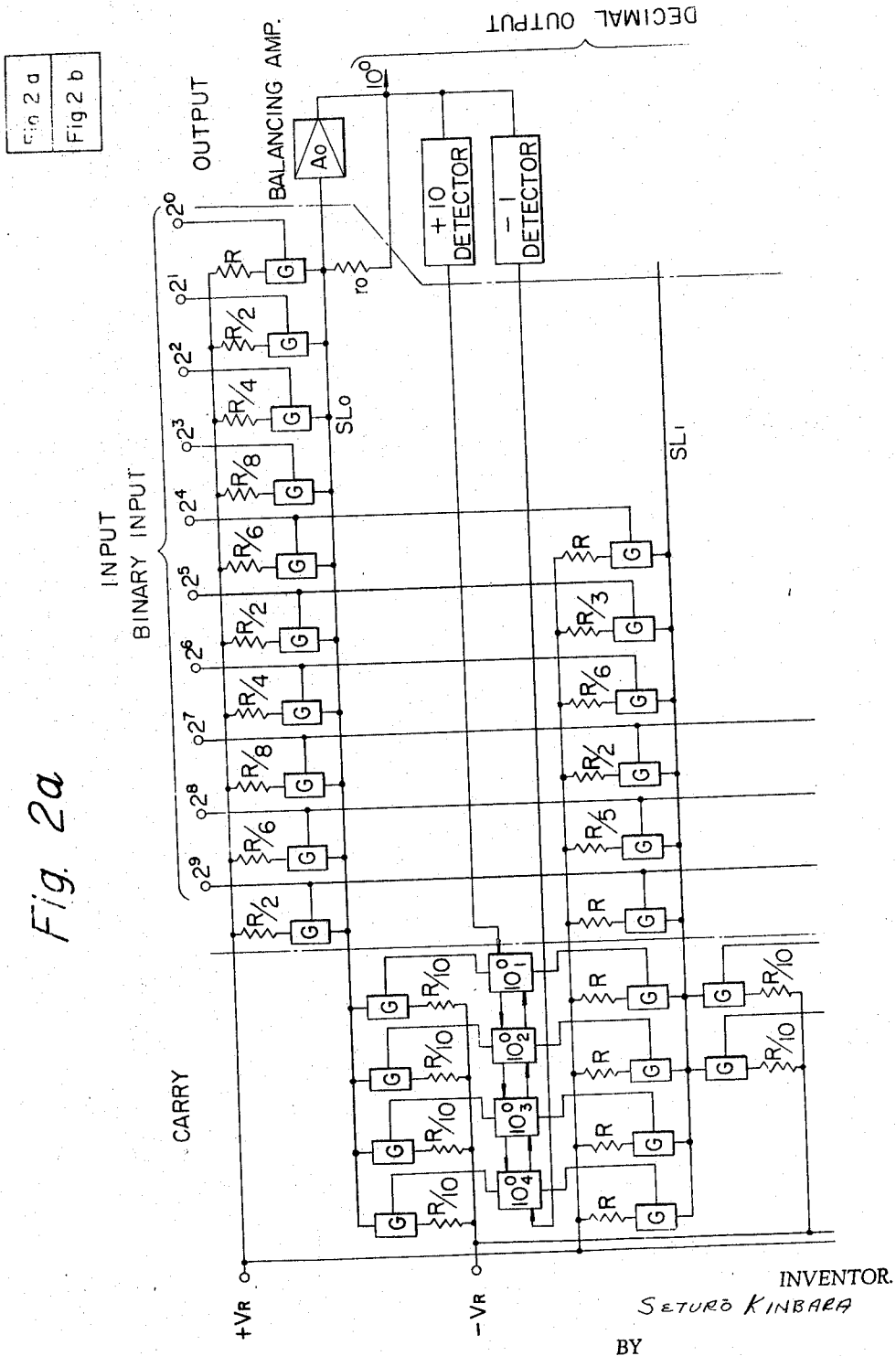
Figure 4A:
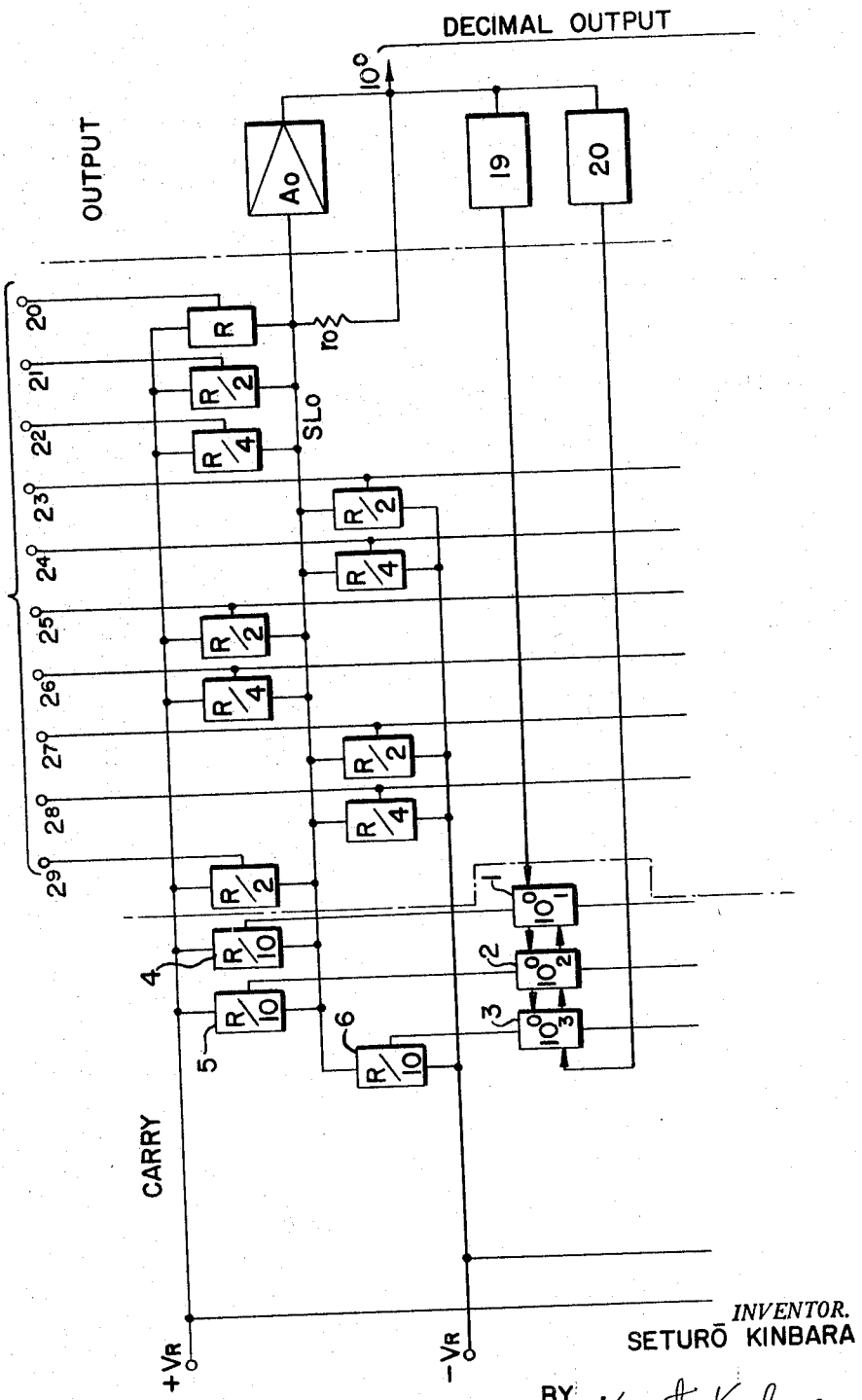
Figure 7A:
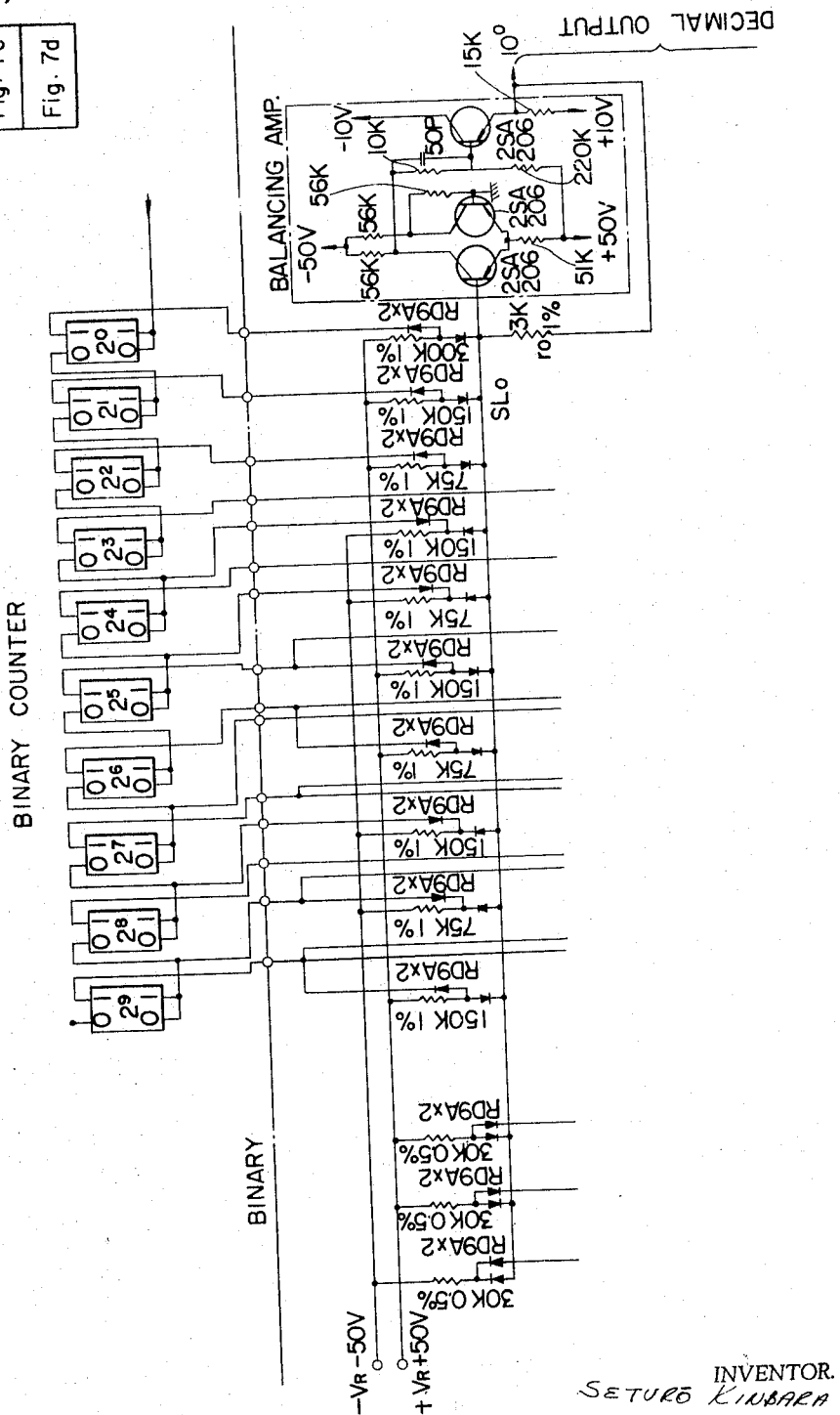
Figure 7D:
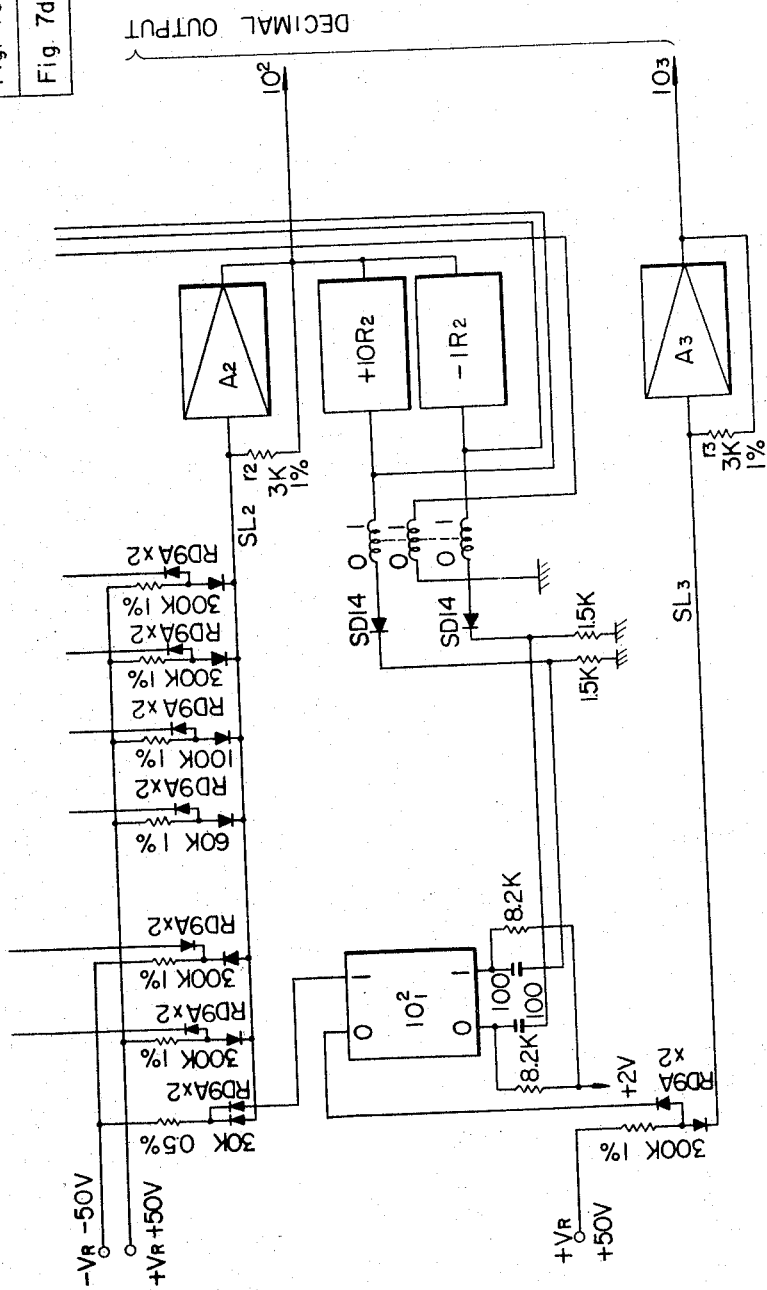

The objects and advantages of this invention will become readily apparent from the following detailed description taken in connection with the accompanying drawings, in which:

FIG. 1 is a block diagram showing the fundamental construction provided in accordance with the present invention in which six figures of the binary code are converted into decimal numbers, FIGS. 2a and 2b taken together comprise a block diagram showing the fundamental construction provided in accordance with the present invention in which ten figures of the binary code are converted into decimal numbers, FIG. 3 is a block diagram showing the construction in which the carry operation is improved in the fundamental construction shown in FIG. 1, FIGS. 4a and 4b taken together comprise a block diagram showing the construction in which the carry operation is improved in the fundamental construction shown in FIG. 2, FIGS. 5a and 5b taken together comprise a block diagram in which the decimal side is constructed digitally so that six figures of the binary code are converted into decimal numbers in accordance with the conversion system of subject invention, FIGS. 6a and 6b taken together comprise a block diagram in which the decimal side is constructed digitally so that ten figures of the binary code are converted into numbers in accordance with the conversion system of subject invention.

Figure 8A:
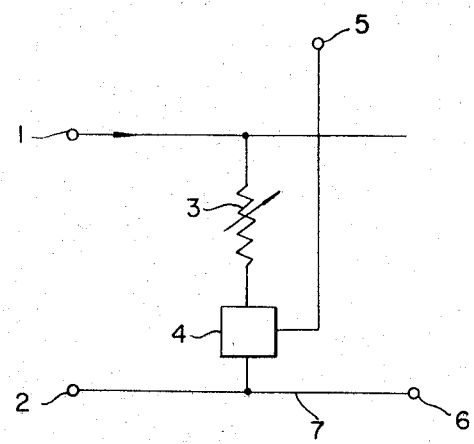
Figure 8B:
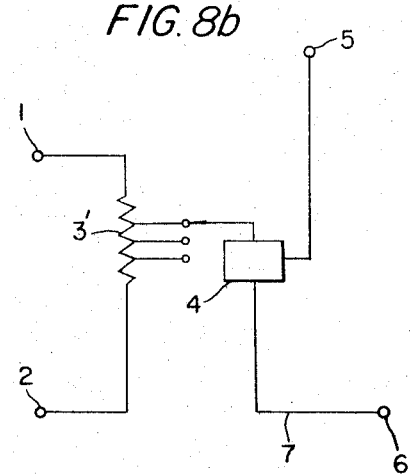

FIGS. 7a, 7b, 7c and 7d taken together comprise an example of a circuit diagram utilized in the construction of subject invention in which ten figures of the binary code are converted into decimal numbers, and FIGS. 8a and 8b illustrate two different systems for handling the reference voltage in a conversion system provided in accordance with the present invention.

There is first disclosed a conversion system in which the binary side is of the principle construction and the decimal side is of an analog construction; this is considered to be the basic system. Second, a conversion system in which the binary side is of the preferred practical construction, and the decimal side is of digital construction, is considered.

FUNDAMENTAL CONSTRUCTION

Generally, every number is represented in the binary code by "0" or "1," but in the decimal code each figure has a particular value. Hereinafter, when the binary code is employed a position of numbers is expressed by the term "figure," and when the decimal-code is employed a position of numbers is expressed by the term "order." In Table 1 below, in the first horizontal row numbers are represented in the binary code (there are represented only 10 figures, but the higher figures are represented similarly); in the second horizontal row numbers are represented in the decimal code. For example, $2^7$ is 128 and if "1" is in the position represented by $2^7$ it means that 128 is involved in the number. In the third, fourth, fifth horizontal rows and so on, there are respectively shown the unit order, that is, the 10th order, the 100th order and so on, of the number represented in the decimal code.

Table 1

| Binary code | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|
| Numbers N represented in Decimal code | 512 | 256 | 128 | 64 | 32 | 16 | 8 | 4 | 2 | 1 |
| Unit order of N | 2 | 6 | 8 | 4 | 2 | 6 | 8 | 4 | 2 | 1 |
| 10th order of N | 1 | 5 | 2 | 6 | 3 | 1 | | | | |
| 100th order of N | 5 | 2 | 1 | | | | | | | |
| 1000th order of N | | | | | | | | | | |

The principle of this invention is that (1) only the figure of a number which is represented by "1" in the binary code is analyzed into an order of the decimal numbers in accordance with Table 2 below, (2) the value of the analyzed decimal numbers are added for each order of the decimal code to thereby obtain the decimal number, and (3) if the resultant of adding becomes more than 10, the resultant is carried over to the next higher order. An embodiment of an electronic circuit performing the binary-decimal conversion, referred to above, is shown in FIG. 1 in a block diagram as to a binary number of 6 figures.

In FIG. 1, the adding operation of each order of a decimal number is operated analogously, that is, in the manner of the operation of an analog computer. Reference numbers 1 and 2 represent sources of the reference voltage +VR and −VR, respectively; the absolute value of the two voltages are equal. Currents which correspond to the values of all figures and orders analyzed in Table 1 pass through resistances 13–20, inclusive, so that the values are added in the form of current. The resistivity of resistance 13 is determined as R and the current passing through resistance 13 is determined as 1. The resistivity of resistances 14, 15, 16, 17, 18, 19 and 20 are determined, respectively, as R/2, R/4, R/8, R/6, R/2, R and R/3. Each resistance is connected to common line 3 or 4 through one of gate circuits 13′ to 20′. Gate circuits 13′ to 20′ are opened and closed in accordance with the state of each figure of the binary number. The construction comprised of resistances and gate circuits 13, 13′, 14, 14′, 15, 15′, 16, 16′, 17, 17′, 18, 18′, 19, 19′, 20 and 20′ are referred to as "The number-current gate circuits." All the fundamental construction of the binary-decimal conversion system in the binary side provided in accordance with subject invention is fully explained above.

In the decimal side, the current applied to the common line is converted into a voltage value by means of balancing amplifiers 5 and 7 and feed back resistances 6 and 8 to give a staircase output voltage at output terminals 25 and 26. Reference number 9 designates a detecting circuit in which when an output reaches more than a voltage corresponding to a number more than 10, the output is detected and a carry signal is generated. Reference number 10 designates another detecting circuit in which when the output on the decimal side drops to less than −1, the output is detected and a signal which returns the excess carry operation is generated. Reference numbers 11 and 12 designate carry flip-flop circuits and reference numbers 21, 21′, 22, 22′, 23, 23′, 24 and 24′ designate the number-current gate circuits used for carrying.

The operation of the system shown in FIG. 1 is explained as follows: a number represented in the binary code is applied to gates 13′ to 20′ through terminals 27 to 32 and the gates corresponding to binary number "1" are open so that currents corresponding to the numbers determined by resistances 13 to 20 are supplied to common lines 3 and 4, common line 3 being assigned to the unit order of the decimal code and common line 4 being assigned to the 10th order of the decimal code. Balancing amplifier 5 used for the unit order and balancing amplifier 7 used for the 10th order form negative feed back by means of resistances 6 and 8, respectively, and operate to supply through resistances 6 and 8 the same current as the current supplied to the common lines so that the potential drops across resistors 6 and 8, respectively, become proportional to the current supplied to the common lines. The potential drops are obtained at terminals 25 and 26 as outputs, respectively, and as staircase voltages as shown in FIG. 1, said staircase voltages being utilized as the decimal outputs. The operation stated above refers to one in which carry is not effected. The operation in which carry is effected is explained hereinafter. When the decimal output is more than 10, detecting circuit 9 detects the fact and generates a carry signal. Flip-flop 11 and gate circuits 21 and 21′ operate and the current in the unit order common line is cancelled to a degree corresponding to value 10. At the same time a current corresponding to value 1 is supplied to the common line so that 1 is added to the 10th order of the decimal code as a carry number by means of gate circuits 23 and 23′. As double carries are necessary at the unit order when 6 figure binary numbers are handled, the carrying circuits are provided in duplicate, and flip-flops 11 and 12 are constructed to operate in shift scaler fashion and reversibly. When numbers in the binary side vary and no carry is required, the output becomes less than −1. This is detected by detecting circuit 10, which detects −1 and generates a signal to borrow, the flip-flops 12 and 11 are reset in regular order to return the carrying operation to the original state.

The carrying operation and borrowing operation, as well as the operation in the balancing amplifier circuitry, automatically follow up any variation in the binary side. All the gates 13′ to 24′, balancing amplifiers 5 and 6, detecting circuits 9 and 10, and flip-flops 11 and 12 are constituted of well known circuit elements which are suitable for the purpose stated above. When the number of figures in the binary code increases, if the number of gate circuits and the carry circuits is increased in accordance with the figures, the construction and operation of the increased circuits are the same as those explained heretofore; the disclosed system can be applied to any number of figures.

An embodiment of the system which may be used with a binary number of 10 figures is shown in block diagram form in FIGS. 2a and 2b.

PRACTICAL CONSTRUCTION OF THE BINARY SIDE

Table 1 shows analyzed numbers depicted over the range from 0 to 9 (actually, in Table 1 numbers 7 and 9 are not represented; however, if the higher figures are considered numbers 7 and 9 are represented). When numbers such as 7, 8 and 9, that is numbers near to 10, are involved, the chance of making carry occurs quite frequently. Therefore, as to the numbers near to 10, if a carry is provided for in advance, the need for making carry concurrently is reduced with the result that quicker operation is possible. From the consideration mentioned above, when the numbers are more than 6, if a carry is effected in advance the operation is performed advantageously. Actually, the critical number to operate or not to operate a carry is not limited to 6, and may be 5 or 7, and the number should be decided through considering the figures to be handled and the distribution of the figures which are to be gathered in the various orders.

When the carry is considered in advance the numbers of the figures are shown in Table 2, below.

In Table 2, in the first horizontal row numbers are represented in the binary code, and in the second horizontal row numbers are represented in the decimal code. In the third, fourth and fifth horizontal rows, are respectively shown the unit order, the 10th order and the 100th order of the number represented in the decimal code. In the sixth horizontal row, is shown a number which is precarried, since the number which is in the unit order in the decimal code is more than 6, and is a complement of 10 represented in minus form. Thereafter, in advance, 1 is added to the 10th order in the decimal code. In the eighth horizontal row, there is shown a number which is the number corresponding to the 10th order in the decimal code and to the number which a pre-carry is effected as stated above. At the same time, when it is expected to carry from the 10th order to the 100th order and if the number is more than 6, the number is represented as a complement of 10 in minus form; thus 1 is added to the 100th order in the decimal code. In the tenth horizontal row, there is shown a number which is the 100th order in the decimal code. As shown in the vertical column of Table 2, referred to as "Sum of same order," when the values shown in the third, the fourth and the fifth horizontal rows which are not effecting carry operation in advance, are compared with the values shown in the sixth, the eighth and the tenth horizontal rows, which effect a carry operation in advance, it will be understood that the values in the sixth, the eighth and the tenth horizontal rows fall in the range 0 to 9 and the chance for a further carry to be required is reduced extremely. However, the carrying circuit number is constructed so as to include the extreme conditions shown in the vertical columns referred to as "Sum of +figure" and "Sum of — figure" in Table 2; thus carry circuits are provided for the cases in which the status of the binary number becomes "1" in either the plus figure or the minus figure. The number of the carry circuit is shown in parentheses in the seventh, the ninth and the eleventh horizontal rows.

Table 2 are applied from the reference voltage to the common line and the resistances are opened and closed by gates 12' to 20'. Reference number 21 designates a resistance by which a current for the carrying operation is applied to the common line in the unit order and the resistance is opened and closed by gate 21', element 22 is a resistance by which a current for the carrying operation is applied to the common line in the 10th order and the resistance is opened and closed by gate 22'. The inputs in the binary code (binary input) are supplied to terminals 25 to 30 and the outputs in the decimal code (decimal output) are obtained at terminals 23 and 24. The fundamental operation in the system of FIG. 3 is similar to that in FIG. 1, but, as some figures in FIG. 3 are supplied at binary inputs in the form of minus, the chance of carry is quite rare. For instance, in FIG. 1 when the binary inputs at terminals 27, 28, 29 and 30 are "1," in other words, the binary numbers in figures $2^0$, $2^1$, $2^2$ and $2^3$ are "1," the total decimal number is 15 and a carry from the unit order to the 10th order should be effected. However, in FIG. 3, since at terminals 25 ($2^0$), 26 ($2^1$) and 27 ($2^2$) plus current is supplied while at terminal 28 ($2^3$) a minus current is supplied and gate 18' is opened in advance so that a precarry current has been applied to the 10th order, the total current in the unit order is $1+2+4-2=5$ and the resultant is obtained without effecting any carry operation so that the time necessary for operation is shortened. The operation effected by the system shown in FIG. 3 which differs from that of the system shown in FIG. 1 only when the numbers in figures $2^3$ and $2^4$ are "1." In this case, the output at terminal 23 of common line 3 of the unit order becomes minus according to an application of minus current, and therefore —1 detecting circuit 10 operates and effects an operation to borrow. Gate circuits 21' and 22' are constructed so that the two gates are open to pass currents when —1 detecting circuit 10 operates and flip-flop 11 is reset; in other words under normal condition, flip-flop 11 is in the 1 state and turns to the 0 state according to the output coming from detecting circuit 10 so as to open gate circuits 21' and 22'.

The practical construction for binary numbers of 10 figures is shown in FIGS. 4a and 4b in a block diagram. Such system operates in the same manner as that explained in FIG. 3 except that the carry circuit is divided into two parts, a plus side and a minus side. In the fundamental constructions shown in FIGS. 1 and 2, as all the binary input into the carry circuit are entered from the plus side, the carry circuit, the output thereof being more than 10, is constructed to be applied by a current corresponding to a value 10 from the minus side. However, in the constructions shown in FIGS. 3 and 4, the input in the binary side are entered from the plus side and the minus side, and therefore a carry operation should be provided at the time when gates on the both sides are open arbitrarily. In conclusion, as shown in parentheses in the seventh, ninth and eleventh horizontal rows

*Table 2*

| Binary code | $2^9$ | $2^8$ | $2^7$ | $2^6$ | $2^5$ | $2^4$ | $2^3$ | $2^2$ | $2^1$ | $2^0$ | Sum of same order | Sum of + figure | Sum of − figure |
|---|---|---|---|---|---|---|---|---|---|---|---|---|---|
| Decimal number | 512 | 256 | 128 | 64 | 32 | 16 | 8 | 4 | 2 | 1 | | | |
| No carry: | | | | | | | | | | | | | |
| Number in unit order | 2 | 6 | 8 | 4 | 2 | 6 | 8 | 4 | 2 | 1 | 43 | | |
| Number in 10th order | 1 | 5 | 2 | 6 | 3 | 1 | | | | | 18 | | |
| Number in 100th order | 5 | 2 | 1 | | | | | | | | 8 | | |
| Carry more than 6: | | | | | | | | | | | | | |
| Number in unit order | 2 | −4 | −2 | 4 | 2 | −4 | −2 | 4 | 2 | 1 | +3 | +15 | −12 |
| Carry from unit order to 10th order | | 1 | 1 | | | 1 | 1 | | | | | (1) | (2) |
| Number in 10th order | 1 | −4 | 3 | −4 | 3 | 2 | 1 | | | | +2 | +10 | −8 |
| Carry from 10th order to 100th order | | 1 | | 1 | | | | | | | | (1) | (1) |
| Number in 100th order | 5 | 3 | 1 | 1 | | | | | | | +10 | +10 | 0 |
| Carry from 100th order to 1000th order | | | | | | | | | | | | (1) | |

In FIG. 3 there is shown a circuit construction for a binary number containing 6 figures in which a carry is effected in advance. Reference numbers 1 and 2 designate sources of a plus reference voltage and a minus reference voltage, respectively; the absolute values of the two voltages are equal. Reference numbers 3 and 4 designate common lines for the unit order and the 10th order, respectively, 5 and 7 designate balancing amplifier circuits, and 6 and 8 designate feedback resistances. Reference number 9 designates a detecting circuit which, when the output becomes a value more than 10, detects the value and generates a carry signal, and reference number 10 designates a detecting circuit which, when the output becomes a value less than −1, detects the value and generates a signal to borrow. Reference number 11 designates a flip-flop for the carrying operation. Reference numbers 12 to 20 designate resistances by which currents corresponding to the values analyzed in of Table 2, it is necessary to provide carry circuit for each of the plus side and the minus side. The relation between the carry flip-flop circuits and the number-current gate circuits are explained as follows: In the decimal number of unit order in FIG. 4, flip-flops 1, 2, and 3 are constructed to operate in shift scaler fashion in the same manner as that in the fundamental construction of FIG. 1, and flip-flops 1 and 2 are set in 1 state at the normal, and flip-flop 3 is reset in 0 state. Under this condition, number-current gate circuits 4, 5, 6, 7, 8 and 9 are constructed to close the gates and not to conduct. Circuits 4, 5, 7 and 8 are prepared to open the gates when flip-flops 1 and 2 are set in 0 state and circuits 6 and 9 are prepared to open the gates when flip-flop 3 is set in 1 state. In the 10th order and the 100th order, the construction is the same as that in the unit order, above discussed.

The operation of the system shown in FIG. 4, as regards the unit order, is as follows: Since all the inputs in the binary code are "0," the outputs are also 0, the carry flip-flops 1 and 2 are in 1 state, and the flip-flop 3 is in 0 state. When inputs in the binary code are applied, and when the plus numbers are involved more than the minus numbers so that the total becomes more than 10 and thus a carry is necessary, plus 10 detecting circuit 19 operates to advance the carry flip-flop by one step. Flip-flops 1 and 2 were already in 1 state and flip-flop 3 is now in 1 state, and therefore all the flip-flops become in a 1 state. As flip-flop 3 is in 1 state, number-current gate circuits 6 and 9 open and circuit 6 suppresses the output in the decimal number of unit order less than 9 while circuit 9 adds 1 for carry to the 10th order. The total of the plus number of the decimal number of unit order converted from the binary number 10 figures, if 15 as shown in the fifth row of the second column from the right in Table 2, is sufficient to provide only one carry circuit.

Next, in FIG. 4, when the minus numbers become more predominant than the plus numbers in the input in the binary code and the output in the decimal code becomes negative, −1 detecting circuit 20 operates to reset, in order, flip-flops 3, 2 and 1 to 0 state. Gate circuits 6 and 9 are closed and the carry in the plus side is returned to the original state, then gate circuit 8 opens to effect a minus carry. If the output in the minus side remains negative, gate circuits 4 and 7 are opened and a second carry in the minus side is effected. The total of the minus numbers of the unit order of the decimal number converted from the binary number of 10 figures is −12 as shown in the fifth row, right hand column in Table 2, and it is necessary to provide two carry circuits. In conclusion, when a binary number is to be converted into a decimal number, 3 carry circuits are necessary for the unit order of the decimal number converted from the binary number of 10 figures.

It will be understood that Table 2 is to be extended to higher figures when the binary figures increase.

DIGITAL CONSTRUCTION IN THE DECIMAL SIDE

The output in the decimal code is represented in any one of the following three ways: (A) it is represented analogously (in the manner of an analog computer) in a variation of a staircase voltage on one line, (B) it is represented as coded forms in the decimal indication on plural lines, (C) it is represented digitally in the decimal code by applying a potential variation to one of 10 lines. The output in the decimal code referred to above in this paragraph is an analogous staircase voltage. It has been explained above how to construct the output in the decimal code digitally in order to apply the subject invention to meet the requirements of the present invention on the decimal side.

FIGS. 5a and 5b constitute a block diagram of a system for handling a binary number of 6 figures in which the output on the decimal side is constructed to operate digitally in accordance with the decimal code. In the construction shown, reference numbers 1 and 2 are a plus and a minus reference voltage, respectively, and the absolute values of the two voltages are equal. Reference numbers 3 and 4 designate common lines for the unit order and the 10th order of the decimal code, respectively, and inputs 37 to 42 in the binary code are analyzed into values for each order. Currents corresponding to the values are applied to each one of the common lines. The currents corresponding to the analyzed values are determined by resistances 18 to 26 and the currents passing through the resistances are opened or closed by gates 18' to 26'. The construction and operation of the input division are the same as those of the input division in the binary code referred to in the previous passages. Reference numbers 5 and 7 are, respectively, the plus detecting circuits of the unit order and the 10th order in the decimal code and reference numbers 6 and 8 are, respectively, the minus detecting circuits of the unit order and the 10th order in the decimal code. These detecting circuits detect the time when common lines 3 and 4 are not at 0 and provide driving pulses to operate flip-flops 9 to 12 and 14 to 17 all in the decimal code. Flip-flops 9 to 12 and 14 to 17 are counters in the decimal code which are constructed by four figures of the binary circuits, each figure of the counters in the decimal code comprising codes corresponding to the decimal numbers, 1, 2, 4 and 8. In the counter, adding operations and subtracting operations can be effected reversibly, and when the plus detecting circuits 5 and 7 operate, the counter effects an adding operation, while when minus detecting circuits 6 and 8 operate, the counter effects a substracting operation. In the two directional operations, a carry pulse is produced for each 10 pulses counted, and the carry pulse operates carry flip-flop 13. Reference numbers 27 to 30 and 27' to 30' designate the number-current gate circuits which were opened and closed by flip-flops of the decimal number of the unit order. Reference numbers 31 to 34 and 31' to 34' designate the number-current gate circuits which were opened and closed by flip-flops of the decimal number of the 10th order. Each one of the gate circuits with the accompanying resistances is so constructed and arranged as to pass currents corresponding to values 1, 2, 4 and 8. The outputs in the decimal code are obtained at reference numbers 43 and 44 as the decimal code form. Carry flip-flop 13 is operated by the carry pulse coming from flip-flops 9 to 12, is set by the carry pulse in the direction of an adding operation and is reset by the carry pulse in the direction of a subtracting operation. Reference numbers 35, 35', 36 and 36' designate the number-current gate circuits for carry; the construction and the relation of the operation to the carry flip-flop circuits are similar to that of the other embodiments described above.

The circuit shown in FIG. 5 operates as follows: When no carry operation is effected, currents are applied to common lines 3 and 4 according to the input in the binary code and they turn to represent plus voltage. Plus detecting circuits 5 and 7 detect the plus voltage and pulses are sent to counters 9 to 12 and 14 to 17. In accordance with the operation of counters 9 to 12 and 14 to 17, currents in gate circuits 27 to 30, 27' to 30', 31 to 34 and 31' to 34' are applied to the common line from the minus side and the current application continues until in the common line the value of plus current coming from the binary side balances the value of minus current coming from the decimal side. For instance, when number $2^2$ in the binary side is in "1," current corresponding to number 4 is applied to the common line from the plus side, and in the decimal side gate circuit 29' is opened by the four pulses and a current corresponding to number 4 which is determined by gate circuit 29 is also applied to the common line. Two currents balance in the common line and detecting circuits 5 and 6 stop their operations. The output of counter 11 in the decimal side is obtained at terminal 43 as number 4. The construction of the binary side in FIG. 5 provides for a carry in advance, and therefore when numbers $2^3$ and $2^4$ in the binary code are in "1" and the other numbers are in "0," as common line 3 becomes minus, in the decimal number of the unit order, detecting circuit 6 operates and generates a pulse which operates counters 9 to 12 in the direction of subtraction. Counters 9 to 12 generate carry pulses in the direction of subtraction as they move from 0 to 9 and the pulses are applied to flip-flop 13 to reset the flip-flop 0 state. The system is so constructed that when flip-flop 13 turns to 0 state, gate circuits 35, 35' and 36, 36' are open, currents are applied to gate circuits 35, 35' and 36, 36', and an operation for borrowing is effected. In the conversion system disclosed above, when the decimal side is constructed analogously, if the decimal output is more than +10 or less than −1, a carry circuit is operated and the output remains between 0 to 9. Thereafter, the output is taken out in the shape of a staircase voltage by means of the balancing amplifier. However, when the decimal side is constructed digitally, the last rest remaining between 0 to 9 is balanced in the common line by means of the current in the gate circuits which are opened and closed by the counter in the decimal code, so that the output of the counter in the balanced state is obtained as the output in the decimal side.

A block diagram for the binary number of 10 figures whose decimal side is constructed digitally is shown in FIG. 6. The constructions of the input in the binary code and the carry circuits are the same as those described above and the construction of the decimal side is the same as that shown in FIG. 5. In FIGS. 5 and 6, the construction of the counters in the decimal code are shown as of the coded type, but any other type counters can be utilized.

The conversion system applied to reference voltage of the present invention may be one such as shown in FIG. 8a; alternatively, such conversion system may be made as shown in FIG. 8b. The reference voltage is applied to gate circuit 4 through a variable resistance 3 (FIG. 8a) or a tapped resistance 3' (FIG. 8b) from terminals 1 and 2 and the input in the binary code coming from terminal 5 is converted into the output in the decimal code at terminal 6 by common line 7 through gate circuit.

The elemental circuits constructing the parts of the binary-decimal conversion system of the present invention are conventional well known elemental circuits. However, the combination effected to get said objects, in other words, the process of the operation is novel. In the binary-decimal conversion system, the operation in the binary side takes place entirely in a one-way fashion, and the number-current gate circuits are opened and closed only according to whether each figure is "0" or "1." Therefore, the operation in the binary side is not affected at all by the conversion process and result. The decimal side automatically follows the current passing through the common line in the binary side, and therefore, the binary side is combined with the decimal side through an intermediate process, that is, through the common line. The characteristic features of the operation is in that at the binary side non-destructible conversion is possible since the binary code has a conversion circuit so that the binary original is not destroyed and at the decimal side provides the ability to follow up owing to the provision of an automatic following circuit.

The operating speed of the conversion system is extremely high since the binary side is put into the number-current gate circuits in parallel at the same time that the summing up operation is effected. The conversion speed is faster by about one figure than that possible with the conventional system. Under the system in which the carry in the binary side is taken account of in advance and the decimal side is represented by the staircase voltage, the conversion time is a time in which the input in the binary code is applied simultaneously in parallel in case no carry is effected and the current in the number-current gate circuit, which is opened then, is converted into a voltage form in the balancing amplifier. The time is covered only by one step.

In FIG. 7, a further circuit of the system is shown. With such circuit the conversion speed in case no carry is effected is about 0.5 micro-second. The speed is mainly affected by the speed of the counter in the binary side rather than the speed of the conversion circuit itself, and the speed of the conversion circuit itself is higher. This means that if the counters in the binary side varies at 1 micro-second rate, it can sufficiently follow up the variation. Next, the conversion time needs a rather long time in which the carry detecting circuits, the carry flip-flop circuits, the carry number-current gate circuits and the balancing circuits, all operate, in case a carry is effected. The speed obtained by the circuit shown in FIG. 7 is such that one carry time is about 1.0 micro-second. The interval in which carry is effected twice successively, is about 1.5 micro-second as the second detecting circuit also operates. As, in the binary numbers of 10 figures the maximum carry numbers are three, the carry operation is completed in 3.5 micro-seconds which is the sum of 0.5 micro-second necessary for the initial balance and two 1.5 micro-seconds necessary for the two intervals between the three carries. This time means a smaller value than the time in the conventional system in which about 60 to 70 micro-seconds is required for the binary number of 10 figures. It is difficult to compare the system of subject invention directly to the system of the conventional system because the operational manners of the two systems are different, but it is true when the circuit elements of nearly the same degree are used and the elemental circuits are constructed under the same consideration. The operational speed of the system of subject invention varies in accordance with the manner of construction, the number of figures, etc. to some extent, and the number of the carry operation is (i) five steps at the maximum for the binary numbers of 10 figures shown in the first embodiment, (ii) three steps at the maximum for the binary numbers of 10 figures shown in the second embodiment, and (iii) 15 steps at the maximum for the binary numbers of 10 figures shown in the third embodiment in which the binary side is constructed as shown in the second embodiment. The operational speed referred to above is, in this case, defined by the time from applying the binary numbers in parallel into the original 0 state to the representation of the final resultant in the terminals in the decimal side.

It is clearly understood from the foregoing explanations on the fundamental construction and the operation of the embodiments that in the conversion system of subject invention a binary number is applied to the number-current gate circuit in parallel, adding is operated in a current form and an output is obtained in a voltage form, and therefore the operational time is shorter by one figure than the conventional conversion system. In the conventional binary-decimal conversion system the numbers in the decimal code are converted into the digital outputs in the decimal code by means of diodes or resistance matrices. However, the more the figures the more the construction elements, and therefore, construction of such conversion system has been impossible economically. In the conversion system of the present invention, even if the figures are numerous, construction of the conversion system can be performed economically. In the conventional conversion system, there is no non-destructive conversion, and there is no follow up, and therefore, the conditions of the original number in the binary code is changed by the conversion. Furthermore, when the binary number is changed at an arbitrary time, the decimal number cannot be obtained unless the conversion circuit is controlled.

These characteristic features are quite important for further utilization of information because the information in the binary side should be stored in a different counter for taking into consideration of later utilization of the information for another purpose. It is unnecessary for the system of the present invention to store the information. The ability to follow up makes it quite easy in the present system in that the present system makes it possible for the operation process to be varied or controlled at the decimal side; thus the operational speed is high. If the ability to follow up were not available, the control circuit would be complicated and the delay in the operation time of the whole digital computer would be extremely high since the converting operation in the binary side would have to be stopped in order to obtain the result of the conversion. Such system would be impractical under most conditions if no ability to follow up were provided.

From the above description it can be seen that the conversion system of subject invention provides conversion which is faster than the conventional system by one figure, provides preservation of the original, and provides the ability to follow up. While some preferred embodiments of the present invention have been illustrated and described, it is recognized that the scope of the present invention is not limited thereto and it is therefore intended that the scope of the present invention be defined by the scope of the appended claims.

What is claimed is:

1. A conversion system in which a number represented in binary code is converted into a number represented in the decimal code, comprising a plurality of gate circuits having resistances introducing a current from a constant voltage source, said current is adapted to correspond to the value of each order of the number represented in the decimal code, said value having a specific value which is adapted to correspond to each figure of the number represented in the binary code, means for summing-up said current at each order of the number represented in the decimal code, means for detecting the summation of said current corresponding to the value of the number represented in the decimal code and for comparing the summation with a reference value, at least one of said gate circuits being opened or closed in accordance with whether the value of the number represented in binary code is (1) or (0) whereby the binary side is constructed to sum up said current only when said number is (1), amplifier means for converting said current to voltage by means of a feed-back resistance, detecting means adapted to detect the decimal output value of more than ten and less than one, said last named means including a constant voltage source, and a plurality of gates and resistors which in accordance with a detecting circuit are adapted to generate a carry signal.

2. The conversion system specified in claim 1 in which means is provided for adding in advance a current corresponding to 1 in the value of the number represented in the binary code to one of the orders of the number represented in the decimal code and for adding in advance a current corresponding to the complement of 10 in the value of the number represented in the decimal code to the next higher order of one of the orders of the number represented in the decimal code in the opposite direction of the current corresponding to said 1, thereby reducing the possibility of effecting the carry.

3. The conversion system specified in claim 2 in which means is provided for detecting 0 of the summing line through balancing the current summed up for each order of the number represented in the decimal code with the gate current opened or closed by a digital signal which is in the opposite direction to the summed up current to obtain, thereby, the number represented in the decimal code by means of the value calculated by the decimal digital counter.

References Cited by the Examiner

UNITED STATES PATENTS 2,839,744  6/1958  Slocomb _____ 340—347
3,059,223  10/1962  Bell _____ 340—173

OTHER REFERENCES

Digital-Analog Converter, in IBM Technical Disclosure Bulletin, volume 2, No. 4, pp. 135–136, December 1959.

MAYNARD R. WILBUR, *Primary Examiner.*

DARYL W. COOK, MALCOLM A. MORRISON,
*Examiners.*

A. L. NEWMAN, *Assistant Examiner.*